US008107224B2

(12) United States Patent
Takahashi et al.

(10) Patent No.: US 8,107,224 B2
(45) Date of Patent: Jan. 31, 2012

(54) THIN SOLID ELECTROLYTIC CAPACITOR HAVING HIGH RESISTANCE TO THERMAL STRESS

(75) Inventors: Masanori Takahashi, Sendai (JP); Takeshi Saito, Sendai (JP); Takeo Kasuga, Sendai (JP); Yuji Yoshida, Sendai (JP); Katsuhiro Yoshida, Sendai (JP); Koji Sakata, Sendai (JP)

(73) Assignee: NEC TOKIN Corporation, Sendai-shi (JP)

( * ) Notice: Subject to any disclaimer, the term of this patent is extended or adjusted under 35 U.S.C. 154(b) by 393 days.

(21) Appl. No.: 12/122,850

(22) Filed: May 19, 2008

(65) Prior Publication Data

US 2008/0291606 A1  Nov. 27, 2008

(30) Foreign Application Priority Data

May 22, 2007 (JP) .................................. 2007-134892

(51) Int. Cl.
*B65D 51/00* (2006.01)
*H01G 9/10* (2006.01)
*H05K 5/03* (2006.01)
*H01G 2/10* (2006.01)
*H01G 9/08* (2006.01)
(52) U.S. Cl. ........................................ 361/537; 361/535
(58) Field of Classification Search .................. 361/535, 361/536, 537, 538
See application file for complete search history.

(56) References Cited

U.S. PATENT DOCUMENTS

| 7,009,834 | B2 * | 3/2006 | Arai et al. | 361/538 |
| 7,010,838 | B2 * | 3/2006 | Arai et al. | 29/25.03 |
| 7,031,141 | B2 * | 4/2006 | Kuriyama | 361/528 |
| 7,206,193 | B2 * | 4/2007 | Nagasawa et al. | 361/535 |
| 7,312,979 | B2 * | 12/2007 | Ishizuka et al. | 361/537 |
| 2005/0168920 | A1 * | 8/2005 | Arai et al. | 361/528 |
| 2006/0087795 | A1 * | 4/2006 | Nagasawa et al. | 361/306.3 |
| 2008/0123253 | A1 * | 5/2008 | Funaya | 361/535 |

FOREIGN PATENT DOCUMENTS

JP  05121278 A  *  5/1993
JP  2000-77269 A     3/2000

* cited by examiner

*Primary Examiner* — Eric Thomas
*Assistant Examiner* — David M Sinclair
(74) *Attorney, Agent, or Firm* — Holtz, Holtz, Goodman & Chick, PC

(57) ABSTRACT

In a thin solid electrolytic capacitor including a solid electrolytic capacitor element disposed on a substrate, the solid electrolytic capacitor element has an upper surface largely extending along the substrate as compared with a height dimension thereof from the substrate. A casing portion is at least partly made of a resin and surrounds the solid electrolytic capacitor element jointly with the substrate. The casing portion includes a non-adhesive member that is in contact with an upper surface of the solid electrolytic capacitor element, but is not adhesive to the solid electrolytic capacitor element.

27 Claims, 5 Drawing Sheets

PRIOR ART

THIN SOLID ELECTROLYTIC CAPACITOR HAVING HIGH RESISTANCE TO THERMAL STRESS

This application is based upon and claims the benefit of priority from Japanese Patent Application JP 2007-134892, filed on May 22, 2007, the disclosure of which is incorporated herein in its entirety by reference.

TECHNICAL FIELD

This invention relates to a solid electrolytic capacitor that can be used for stabilizing the power supply voltage of an electronic device and reducing high-frequency noise thereof.

BACKGROUND ART

For example, Japanese Unexamined Patent Application Publication (JP-A) No. 2000-77269 discloses an example of a solid electrolytic capacitor. The solid electrolytic capacitor comprises a capacitor element using a valve-acting metal, a lead frame connected to the capacitor element, and a casing resin covering the capacitor element and a part of the lead frame. The lead frame is subjected to bending and then covered with the casing resin. The casing resin is applied to the capacitor element, for example, by a transfer mold method.

There is also known a casing structure called a CSP (Chip Size Package). In the CSP, an electronic component or the like mounted on a substrate is covered with a resin and the resin is firmly bonded to the substrate.

Following the reduction in size and thickness of electronic devices in recent years, there has also been an increasing demand for a reduction in size and thickness of electronic components. Under these circumstances, the necessity for a reduction in size and thickness of solid electrolytic capacitors has also been increasing.

SUMMARY OF THE INVENTION

However, as the reduction in thickness of the solid electrolytic capacitors advances, it becomes difficult to apply bending to lead frames thereof. In view of this, the solid electrolytic capacitor disclosed in Japanese Unexamined Patent Application Publication (JP-A) No. 2000-77269 has difficulty in adapting to the recent thickness reduction. Particularly, in the case of using the transfer mold method, the reduction in thickness of the solid electrolytic capacitors is difficult to achieve.

On the other hand, in the case of a casing jointly using a substrate and a resin like in the CSP, the thickness reduction is relatively easy. However, since strong adhesion is required between the resin and the substrate, there is needed a resin having a strong adhesive force. Consequently, if this type of casing is used in a solid electrolytic capacitor, a capacitor element and the resin are also firmly bonded together. If, in this state, the solid electrolytic capacitor is subjected to thermal stress, for example, at the time of mounting on a board, there is a possibility that the resin expands to cause a problem that the surfaces of the capacitor element are subjected to stripping due to tensile stress caused by the expansion of the resin or the equivalent series resistance (hereinafter referred to as an "ESR") increases.

It is therefore an exemplary object of this invention to provide a thin solid electrolytic capacitor with little possibility of causing such a problem even when subjected to thermal stress.

Other objects of the present invention will become clear as the description proceeds.

According to an exemplary aspect of the present invention, there is provided a thin solid electrolytic capacitor comprising a substrate, a solid electrolytic capacitor element disposed on the substrate and having an upper surface largely extending along the substrate as compared with a height dimension thereof from the substrate and a casing portion at least partly made of a resin and surrounding the solid electrolytic capacitor element jointly with the substrate, wherein the casing portion comprises a non-adhesive member that is in contact with an upper surface of the solid electrolytic capacitor element, but is not adhesive to the solid electrolytic capacitor element.

DESCRIPTION OF THE EXEMPLARY EMBODIMENTS

Figure 1A:
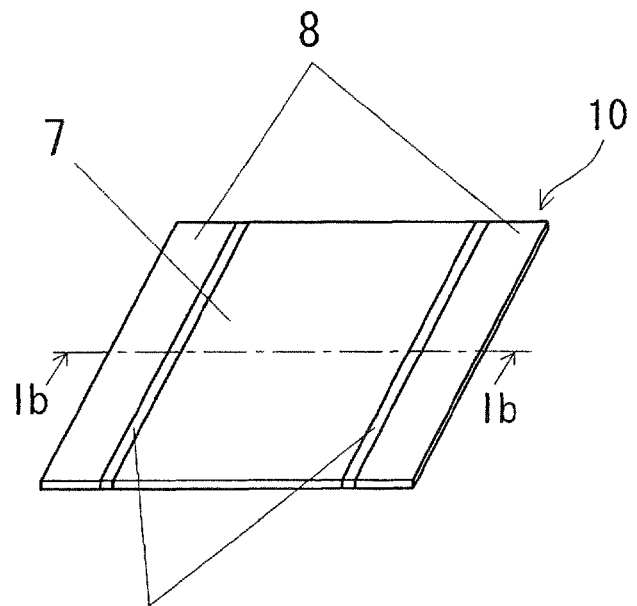
FIG. 1A is a perspective view showing the basic structure of a capacitor element for use in embodiments of this invention.
Figure 1B:
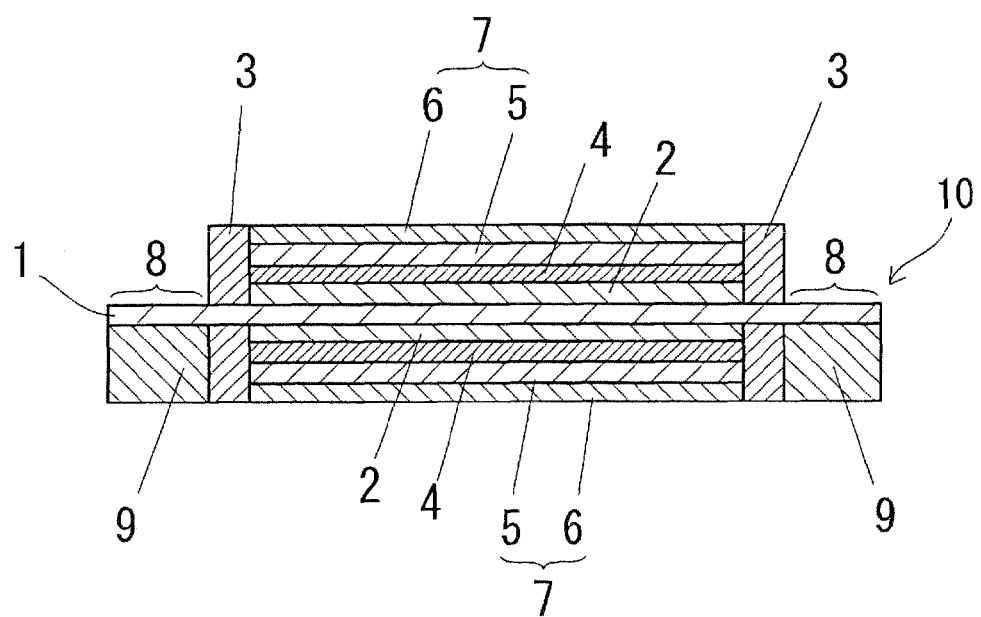
FIG. 1B is a sectional view taken along line 1b-1b in FIG. 1A.

Referring to FIGS. 1A and 1B, a capacitor element 10 applicable to various embodiments of this invention will first be described using a manufacturing method thereof.

At first, a flat plate-like metal base member 1 was formed with porous portions and then subjected to anodic oxidation, so that oxide films 2 were formed on both sides or opposite principal surfaces of the metal base member 1, respectively. As the metal base member 1, a selection was made of an aluminum foil commercialized for use in an aluminum electrolytic capacitor and having a capacitance per unit area of 220 $\mu F/cm^2$ and a thickness of 70 $\mu m$, wherein the nominal anodization voltage for forming the oxide films was 3 V.

Then, for isolation between an anode and a cathode, a resin mainly containing an epoxy resin was coated on both sides of the metal base member 1 so as to be impregnated into the porous portions thereof and then was cured, thereby forming two mutually spaced-apart insulating portions 3 on each side of the metal base member 1. After the formation of the insulating portions 3, a solid electrolyte layer 4 of a conductive polymer was formed on each oxide film 2 in an inner region between the two insulating portions 3, i.e. in a cathode region, and subsequently, a graphite layer 5 and a silver layer 6 were formed, thereby forming a cathode conductor portion 7 so as to surround the opposite principal surfaces of the metal base member 1 and end surfaces adjacent to the opposite principal surfaces. Therefore, the cathode conductor portion 7 continuously extends between the both sides of the metal base member 1.

Thereafter, each oxide film 2 in outer regions outside the two insulating portions 3, i.e. in anode regions, was removed and lead frames 9 each in the form of an Ni—, Cu—, or Ag-plated Cu foil were ultrasonic-welded to the outer regions, respectively, thereby forming anode conductor portions 8. The lead frames 9 were disposed on only one side of the metal base member 1.

Figure 2:
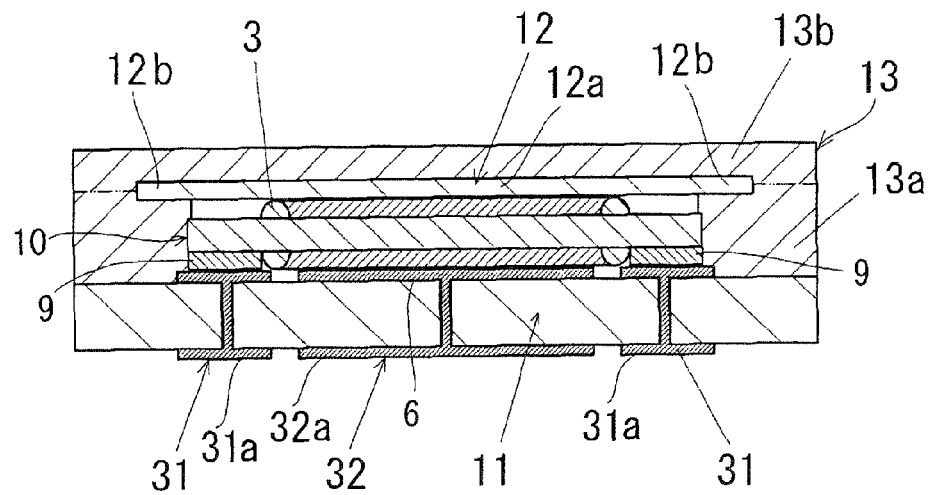
FIG. 2 is a sectional view of a thin solid electrolytic capacitor according to a first embodiment of this invention.

Referring to FIG. 2, a thin solid electrolytic capacitor according to a first embodiment of this invention will be described.

The thin solid electrolytic capacitor of FIG. 2 includes a mounting substrate 11. A plurality of conductors 31 and 32 are attached to the substrate 11.

The capacitor element 10 is disposed on the substrate 11. The capacitor element 10 has an upper surface largely extending along the substrate 11 as compared with its height dimension from the substrate 11.

The thin solid electrolytic capacitor further includes a casing portion 13 at least part of which is made of a resin. The casing portion 13, jointly with the substrate 11, surrounds the capacitor element 10.

The casing portion 13 comprises a frame 13a disposed around the capacitor element 10 and bonded to the substrate 11, a cover 13b bonded to an upper surface of the frame 13a, and a plate-like non-adhesive member 12 disposed in tight contact with an inner surface of the cover 13b and fixed in the casing portion 13. The non-adhesive member 12 comprises a central first portion 12a being in contact with the upper surface of the capacitor element 10 and a second portion 12b extending radially outward from the first portion 12a and sandwiched between the frame 13a and the cover 13b.

The conductors 31 and the conductor 32 have anode terminals 31a and a cathode terminal 32a, respectively, on a lower surface of the substrate 11. The conductors 31 and 32 each vertically penetrate the substrate 11. On the upper side of the substrate 11, each conductor 31 is connected to the lead frame 9 of the capacitor element 10 and the conductor 32 is connected to the silver layer 6 of the capacitor element 10. The connection between each conductor 31 and the lead frame 9 and the connection between the conductor 32 and the silver layer 6 can be achieved by coating a conductive adhesive on the lead frame 9 and the silver layer 6 and then applying heat and pressure to carry out bonding therebetween.

The non-adhesive member 12 is placed on this capacitor element 10 so as to cover the upper surface thereof. Further, the capacitor element 10 and the non-adhesive member 12 are covered with and brought into tight contact with the frame 13a and the cover 13b, thereby obtaining the thin solid electrolytic capacitor. Herein, the frame 13a and the cover 13b jointly serve as a cover member.

The non-adhesive member 12 can be made of a resin such as a polyimide, a liquid crystal polymer, a fluororesin, or a heat-resistant polystyrene. The frame 13a and the cover 13b are each made of a prepreg in the form of a glass cloth (glass fiber base member) impregnated with an epoxy resin. The frame 13a and the cover 13b may each be made of an adhesive resin such as an epoxy resin, an acrylic-based resin, or an urethane-based resin.

Now, a description will be given of a specific method of manufacturing the thin solid electrolytic capacitor of FIG. 2.

At first, the frame 13a in which the shape corresponding to an external shape of the capacitor element 10 was punched out was placed on the substrate 11 with the capacitor element 10 bonded thereto under heat and pressure. Then, the non-adhesive member 12 was placed on the capacitor element 10. The non-adhesive member 12 had an area smaller than that of an external shape of the product, i.e. the thin solid electrolytic capacitor, thereby preventing exposure of the non-adhesive member 12 on a side or sides of the product. This is for securely bonding the frame 13a and the cover 13b together around the capacitor element 10. Then, the cover 13b was further placed on the frame 13a and the non-adhesive member 12. In this state, pressing was carried out under conditions of 170° C., 30 minutes, and 0.5 MPa at a vacuum of 10 Torr, thereby obtaining the thin solid electrolytic capacitor of FIG. 2.

Figure 3:
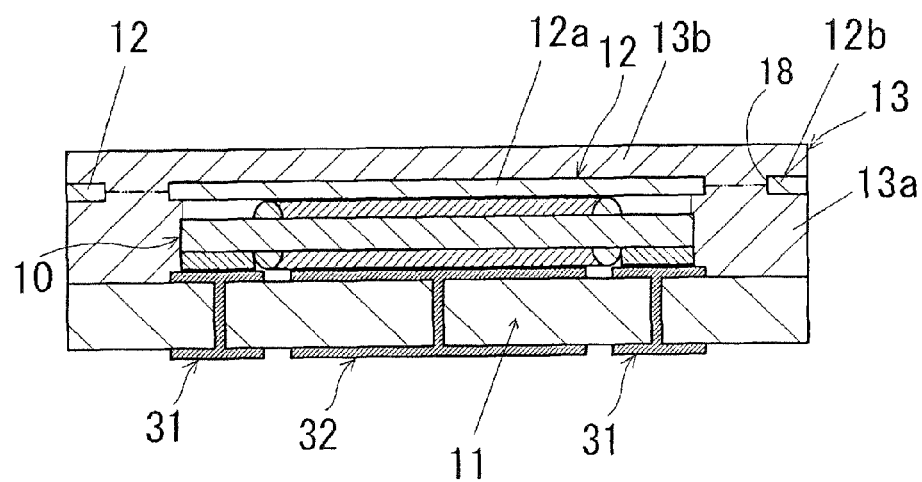
FIG. 3 is a sectional view of a thin solid electrolytic capacitor according to a second embodiment of this invention.
Figure 4A:
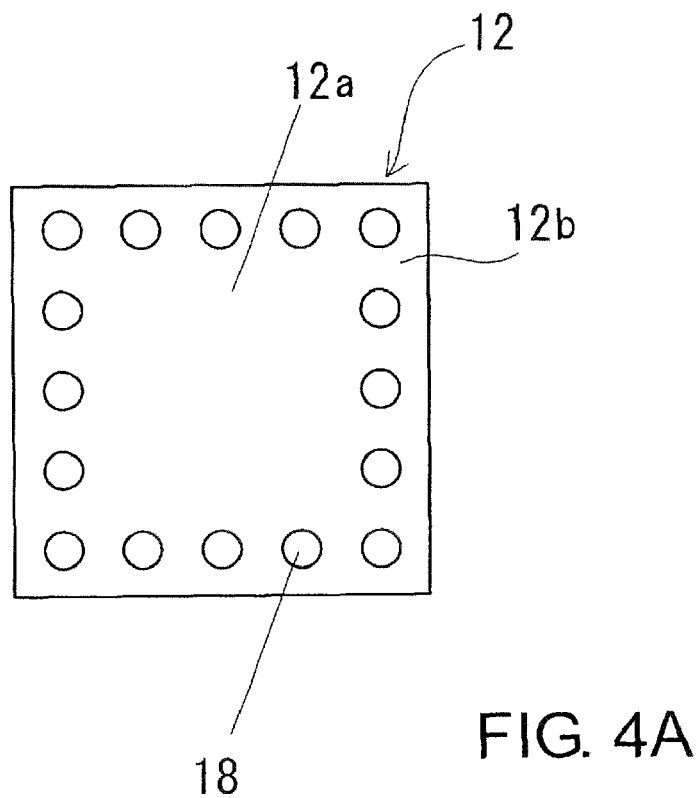
FIG. 4A is a plan view showing a non-adhesive member used in the thin solid electrolytic capacitor of FIG. 3.

Referring to FIGS. 3 and 4A, a thin solid electrolytic capacitor according to a second embodiment of this invention will be described. The same or corresponding portions are assigned the same reference symbols, thereby omitting description thereof.

In the thin solid electrolytic capacitor of FIG. 3, a plate-like non-adhesive member 12 has a number of openings 18 at its second portion 12b. Portions of a frame 13a and/or a cover 13b are inserted into these openings 18. Specifically, portions of a prepreg or an adhesive resin forming the frame 13a and/or the cover 13b enter the openings 18 of the non-adhesive member 12. Consequently, the non-adhesive member 12 is bonded to and substantially integrated with the frame 13a and the cover 13b.

According to the thin solid electrolytic capacitor of FIG. 3, positioning of the non-adhesive member 12 is easy and thus positional deviation thereof can be prevented, and therefore, it is possible to facilitate position matching of edges or corners of the non-adhesive member 12 with edges or corners of the frame 13a and the cover 13b.

Figure 4B:
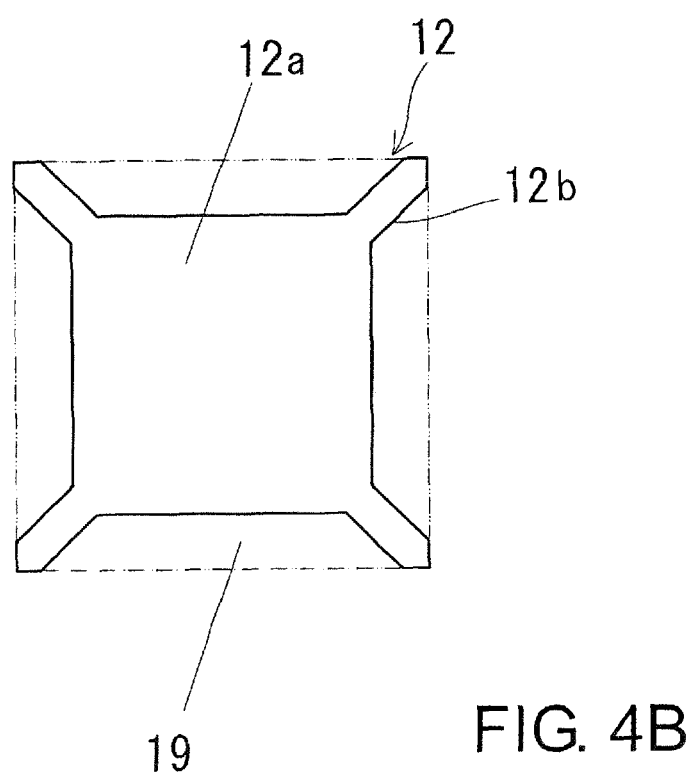
FIG. 4B is a plan view showing a modification of the non-adhesive member of FIG. 4A.

As shown in FIG. 4B, use may be made of a plate-like non-adhesive member 12 having a second portion 12b formed with cutouts 19.

Figure 5:
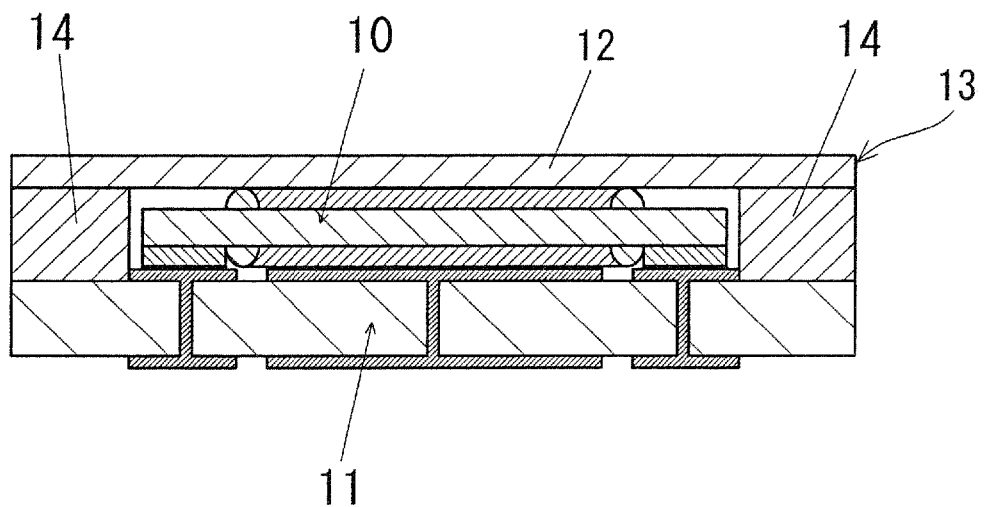
FIG. 5 is a sectional view of a thin solid electrolytic capacitor according to a third embodiment of this invention.

Referring to FIG. 5, a thin solid electrolytic capacitor according to a third embodiment of this invention will be described. The same or corresponding portions are assigned the same reference symbols, thereby omitting description thereof.

In the thin solid electrolytic capacitor of FIG. 5, an adhesive 14 is coated on a substrate 11 around the capacitor element 10 bonded thereto under heat and pressure and a non-adhesive member 12 is bonded to the substrate 11 through the adhesive 14, thereby forming a casing portion 13. The fluidity of the adhesive 14 during heating is small.

Now, a description will be given of a specific method of manufacturing the thin solid electrolytic capacitor of FIG. 5.

A liquid epoxy resin was coated on the substrate 11 around the capacitor element 10 using a dispenser and, as the non-adhesive member 12, a plate member made of a liquid crystal polymer was placed on the liquid epoxy resin. The plate member was, in advance, surface-treated so as to be capable of bonding with the adhesive. Thereafter, pressing was carried out under conditions of 150° C., 30 minutes, and 0.5 MPa at a vacuum of 10 Torr, thereby obtaining the thin solid electrolytic capacitor of FIG. 5.

Figure 6:
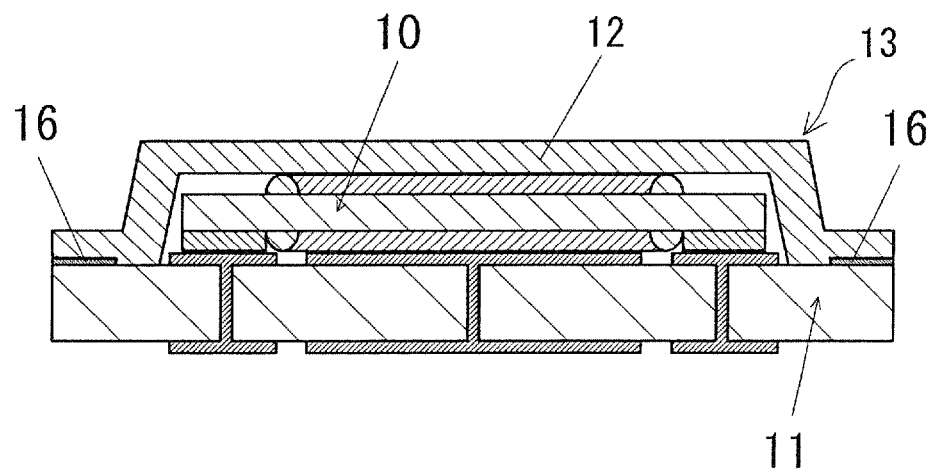
FIG. 6 is a sectional view of a thin solid electrolytic capacitor according to a fourth embodiment of this invention.

Referring to FIG. 6, a thin solid electrolytic capacitor according to a fourth embodiment of this invention will be described. The same or corresponding portions are assigned the same reference symbols, thereby omitting description thereof.

In the thin solid electrolytic capacitor of FIG. 6, a liquid crystal polymer was placed over a substrate 11 with the capacitor element 10 bonded thereto under heat and pressure and pressing was applied to the liquid crystal polymer only at its portion around the capacitor element 10 without heating it, thereby forming a non-adhesive member 12 of the liquid crystal polymer. The pressing conditions were 300° C. and 1 minute, wherein a casing portion 13 was formed by joining the non-adhesive member 12 and the substrate 11 along a fusion-bonded portion 16. A liquid crystal polymer can be used as a material of the substrate 11.

Figure 7:
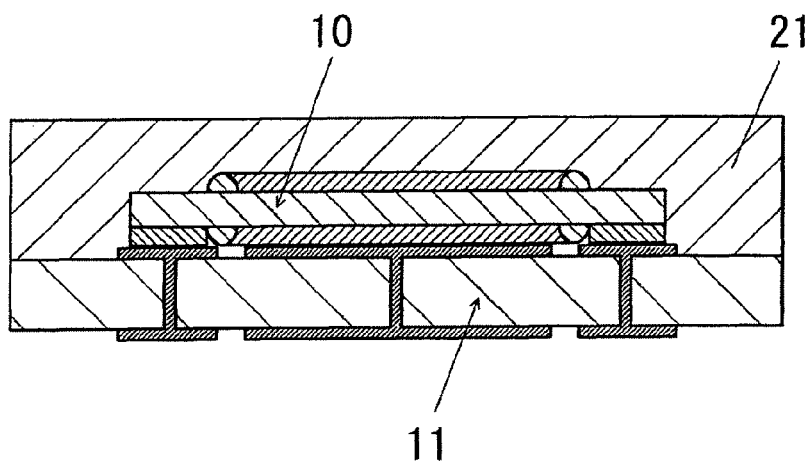
FIG. 7 is a sectional view of a thin solid electrolytic capacitor of a comparative example.

Referring to FIG. 7, a description will be given of a thin solid electrolytic capacitor as a comparative example. The same or corresponding portions are assigned the same reference symbols, thereby omitting description thereof.

In the thin solid electrolytic capacitor of FIG. 7, any of the foregoing non-adhesive members 12 is provided. The thin solid electrolytic capacitor of FIG. 7 was manufactured by coating an adhesive resin 21, using a dispenser, over a substrate 11 with the capacitor element 10 bonded thereto under heat and pressure, curing the adhesive resin 21 by heating at 150° C. for 30 minutes at a reduced pressure, and then carrying out dicing.

The thin solid electrolytic capacitors according to the comparative example and the first to fourth embodiments were prepared each in the number of five and the ESRs thereof at 100 kHz before and after solder reflow (260° C., 15 seconds) were compared with each other. The results are shown in FIG. 8.

Figure 8:
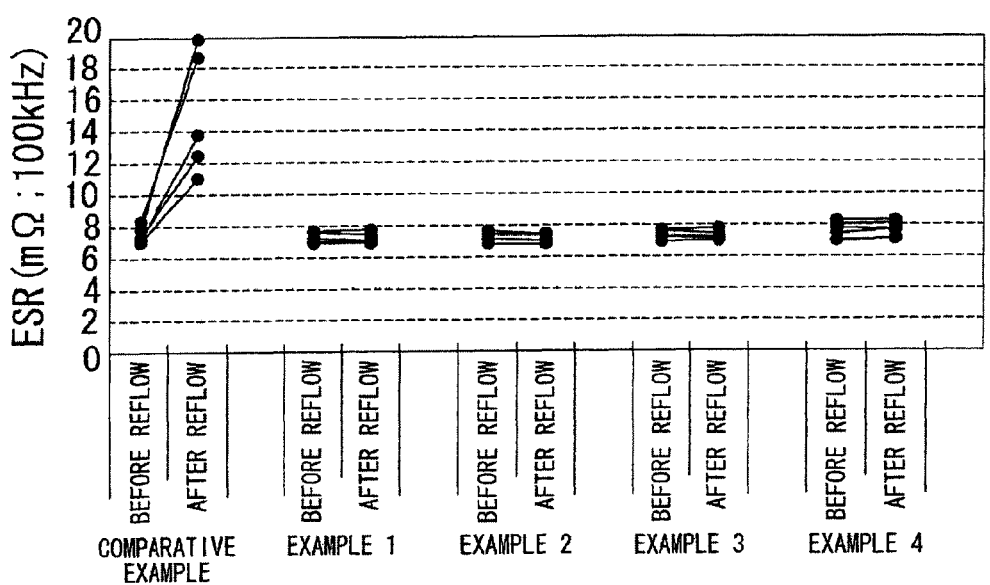
FIG. 8 is a diagram showing changes in ESR (100 kHz) before and after solder reflow with respect to the thin solid electrolytic capacitor of the comparative example and the thin solid electrolytic capacitors according to the first to fourth embodiments.

As seen from FIG. 8, there was a large increase in ESR before and after the reflow in each of the thin solid electrolytic capacitors of the comparative example, while, there was almost no increase in ESR before and after the reflow in each of the thin solid electrolytic capacitors according to the first to fourth embodiments.

Therefore, it is possible to provide the thin solid electrolytic capacitors with almost no increase in ESR otherwise caused by the reflow. Further, since the casing portion is formed by jointly using the substrate and the resin, it is easy to achieve the thickness reduction which would otherwise be difficult to achieve according to the conventional transfer mold or casing resin. Further, since the non-adhesive member is provided between the capacitor element and the resin of the casing portion, it is possible to suppress the application of tensile stress to the capacitor element even when subjected to thermal stress caused by solder reflow or the like, thus effectively preventing the increase in ESR.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. For example, the shape of the non-adhesive member may be modified other than those shown in FIGS. 4A and 4B.

What is claimed is:

1. A thin solid electrolytic capacitor, comprising:
   a substrate;
   a solid electrolytic capacitor element which is disposed on the substrate and which has an upper surface extending farther in a dimension along the substrate than in a height dimension thereof from the substrate; and
   a casing portion which is at least partly made of a resin and which surrounds the solid electrolytic capacitor element jointly with the substrate;
   wherein the casing portion comprises:
      a non-adhesive member which is in contact with the upper surface of the solid electrolytic capacitor element, and which is not adhered to the solid electrolytic capacitor element; and
      a cover member which is connected to the non-adhesive member and the substrate, and which covers the solid electrolytic capacitor element and the non-adhesive member.

2. The thin solid electrolytic capacitor according to claim 1, wherein the solid electrolytic capacitor element comprises:
   a plate-like or foil-like base member which is made of a valve-acting metal and which is fixed to the substrate;
   an anode conductor portion which is connected to a part of the base member;
   a cathode conductor portion which faces another part of the base member; and
   a solid electrolyte layer which is interposed between the cathode conductor portion and the base member.

3. The thin solid electrolytic capacitor according to claim 2, wherein the cathode conductor portion comprises:
   a surface silver layer; and
   a graphite layer which is interposed between the silver layer and the solid electrolyte layer.

4. The thin solid electrolytic capacitor according to claim 2, wherein the solid electrolytic capacitor element further comprises a dielectric layer which is made of an oxide of the base member and which is interposed between the solid electrolyte layer and the base member.

5. The thin solid electrolytic capacitor according to claim 4, wherein the dielectric layer, the solid electrolyte layer, the cathode conductor portion, and the anode conductor portion are disposed between the substrate and the base member.

6. The thin solid electrolytic capacitor according to claim 5, further comprising an insulating portion formed between (i) the anode conductor portion and (ii) the dielectric layer, the solid electrolyte layer, and the cathode conductor portion.

7. The thin solid electrolytic capacitor according to claim 4, wherein the dielectric layer, the solid electrolyte layer, and the cathode conductor portion are disposed on a side opposite to the base member with respect to the substrate, and the anode conductor portion is disposed between the substrate and the base member.

8. The thin solid electrolytic capacitor according to claim 4, wherein the dielectric layer, the solid electrolyte layer, and the cathode conductor portion are disposed on each of mutually opposite sides of the base member.

9. The thin solid electrolytic capacitor according to claim 1, wherein the cover member is made of an adhesive resin.

10. The thin solid electrolytic capacitor according to claim 1, wherein the cover member is made of a prepreg.

11. The thin solid electrolytic capacitor according to claim 1,
   wherein the non-adhesive member comprises:
      a first portion being in contact with the upper surface of the solid electrolytic capacitor element; and
      a second portion extending from the first portion and embedded in the cover member.

12. The thin solid electrolytic capacitor according to claim 11, wherein the second portion includes a plurality of openings, and wherein the cover member enters the openings.

13. The thin solid electrolytic capacitor according to claim 11, wherein the second portion includes a plurality of cutouts, and wherein the cover member enters the cutouts.

14. The thin solid electrolytic capacitor according to claim 1, wherein the casing portion comprises an adhesive connected to the substrate and disposed around the solid electrolytic capacitor element, and wherein the non-adhesive member is fixed to the substrate by the adhesive.

15. The thin solid electrolytic capacitor according to claim 14,
   wherein the non-adhesive member comprises:
      a first portion which is in contact with the upper surface of the solid electrolytic capacitor element; and
      a second portion which extends from the first portion and which is fixed to the adhesive.

16. The thin solid electrolytic capacitor according to claim 1, wherein the non-adhesive member is made of at least one of a polyimide, a liquid crystal polymer, a fluororesin, and a heat-resistant polystyrene.

17. A thin solid electrolytic capacitor, comprising:
   a substrate;
   a solid electrolytic capacitor element which is disposed on the substrate and which has an upper surface extending farther in a dimension along the substrate than in a height dimension thereof from the substrate; and a casing portion which is at least partly made of a resin and which surrounds the solid electrolytic capacitor element jointly with the substrate;

wherein the casing portion is entirely made of a non-adhesive member and is connected to the substrate;

wherein the non-adhesive member is in contact with the upper surface of the solid electrolytic capacitor element, and is not adhered to the solid electrolytic capacitor element.

18. The thin solid electrolytic capacitor according to claim 17, wherein the casing portion is bonded to the substrate by an adhesive, so that the substrate and the casing portion jointly seal the solid electrolytic capacitor element.

19. The thin solid electrolytic capacitor according to claim 17, wherein the casing portion is fusion-bonded to the substrate, so that the substrate and the casing portion jointly seal the solid electrolytic capacitor element.

20. The thin solid electrolytic capacitor according to claim 17, wherein the non-adhesive member is made of at least one of a polyimide, a liquid crystal polymer, a fluororesin, and a heat-resistant polystyrene.

21. The thin solid electrolytic capacitor according to claim 17, wherein the solid electrolytic capacitor element comprises:

a plate-like or foil-like base member which is made of a valve-acting metal and which is fixed to the substrate;

an anode conductor portion which is connected to a part of the base member;

a cathode conductor portion which faces another part of the base member; and a solid electrolyte layer which is interposed between the cathode conductor portion and the base member.

22. The thin solid electrolytic capacitor according to claim 21, wherein the cathode conductor portion comprises:

a surface silver layer; and a graphite layer which is interposed between the silver layer and the solid electrolyte layer.

23. The thin solid electrolytic capacitor according to claim 21, wherein the solid electrolytic capacitor element further comprises a dielectric layer which is made of an oxide of the base member and which is interposed between the solid electrolyte layer and the base member.

24. The thin solid electrolytic capacitor according to claim 23, wherein the dielectric layer, the solid electrolyte layer, the cathode conductor portion, and the anode conductor portion are disposed between the substrate and the base member.

25. The thin solid electrolytic capacitor according to claim 24, further comprising an insulating portion formed between (i) the anode conductor portion and (ii) the dielectric layer, the solid electrolyte layer, and the cathode conductor portion.

26. The thin solid electrolytic capacitor according to claim 23, wherein the dielectric layer, the solid electrolyte layer, and the cathode conductor portion are disposed on a side opposite to the base member with respect to the substrate, and the anode conductor portion is disposed between the substrate and the base member.

27. The thin solid electrolytic capacitor according to claim 23, wherein the dielectric layer, the solid electrolyte layer, and the cathode conductor portion are disposed on each of mutually opposite sides of the base member.

* * * * *